(12) United States Patent
Ferrer

(10) Patent No.: US 7,631,835 B2
(45) Date of Patent: Dec. 15, 2009

(54) METHOD OF SELECTIVELY DECOUPLING SOLIDBORNE NOISE, A LAMINATED BALL JOINT, A MECHANICAL CONNECTION, AND AN AIRCRAFT

(75) Inventor: Rogelio Ferrer, Marseilles (FR)

(73) Assignee: Eurocopter, Marignane (FR)

( * ) Notice: Subject to any disclaimer, the term of this patent is extended or adjusted under 35 U.S.C. 154(b) by 742 days.

(21) Appl. No.: 11/500,893

(22) Filed: Aug. 9, 2006

(65) Prior Publication Data
US 2007/0034736 A1 Feb. 15, 2007

(30) Foreign Application Priority Data
Aug. 10, 2005 (FR) .................................. 05 08497

(51) Int. Cl.
B64C 27/00 (2006.01)
(52) U.S. Cl. ..................... 244/17.27; 244/1 N; 384/221
(58) Field of Classification Search ............ 244/17.27, 244/1 N, 54; 384/221, 220
See application file for complete search history.

(56) References Cited
U.S. PATENT DOCUMENTS

| | | | |
|---|---|---|---|
| 4,365,771 A | 12/1982 | Halwes et al. | |
| 5,186,686 A * | 2/1993 | Staples et al. | 464/69 |
| 5,523,530 A | 6/1996 | Byrnes et al. | |
| 5,566,919 A * | 10/1996 | Shephard | 248/604 |
| 5,845,236 A * | 12/1998 | Jolly et al. | 702/195 |
| 5,904,317 A * | 5/1999 | Elliott et al. | 244/1 N |
| 7,290,985 B2 * | 11/2007 | James et al. | 416/1 |
| 7,461,815 B2 * | 12/2008 | Almeras et al. | 244/54 |

FOREIGN PATENT DOCUMENTS
FR    2 474 996    8/1981

\* cited by examiner

Primary Examiner—Christopher P Ellis
(74) Attorney, Agent, or Firm—Young & Thompson

(57) ABSTRACT

Solidborne noise and vibration is decoupled in a rotary wing aircraft by a laminated ball joint (15) for a suspension bar (13) of a transmission gearbox, the ball joint including at least two damper layers (19) dedicated to a frequency band for decoupling in the range 0 to 7000 Hz. For this purpose, the damper layers (19) and possibly also likewise dedicated interleaved layers (20) are given shape and/or dimension and/or physical-property parameters as a function of the frequency for decoupling in the determined frequency band.

21 Claims, 4 Drawing Sheets

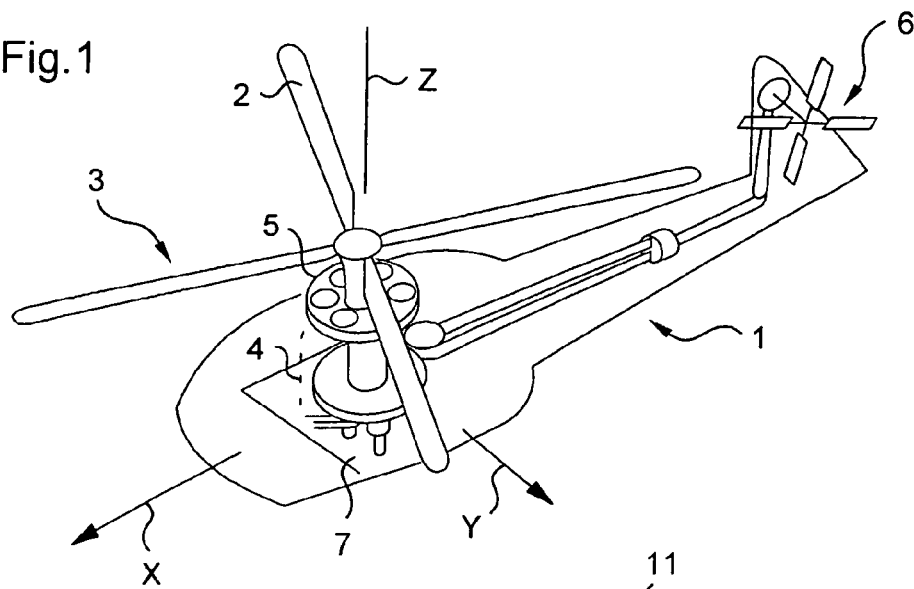
Fig.1
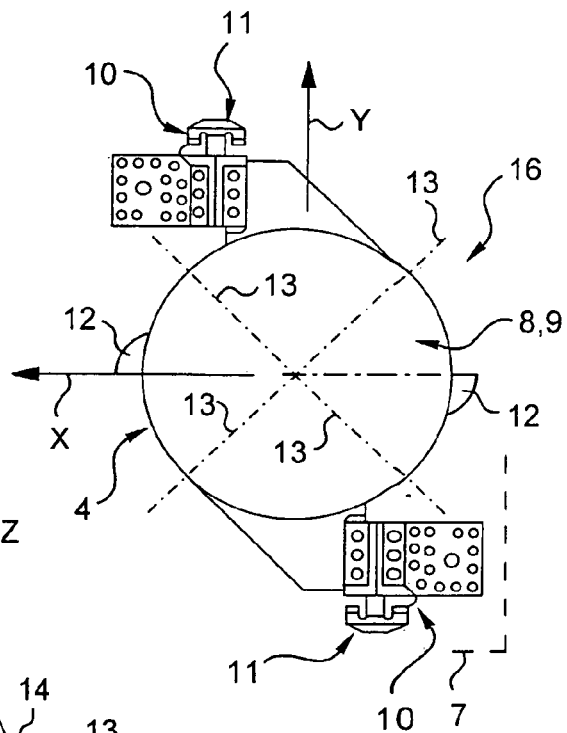

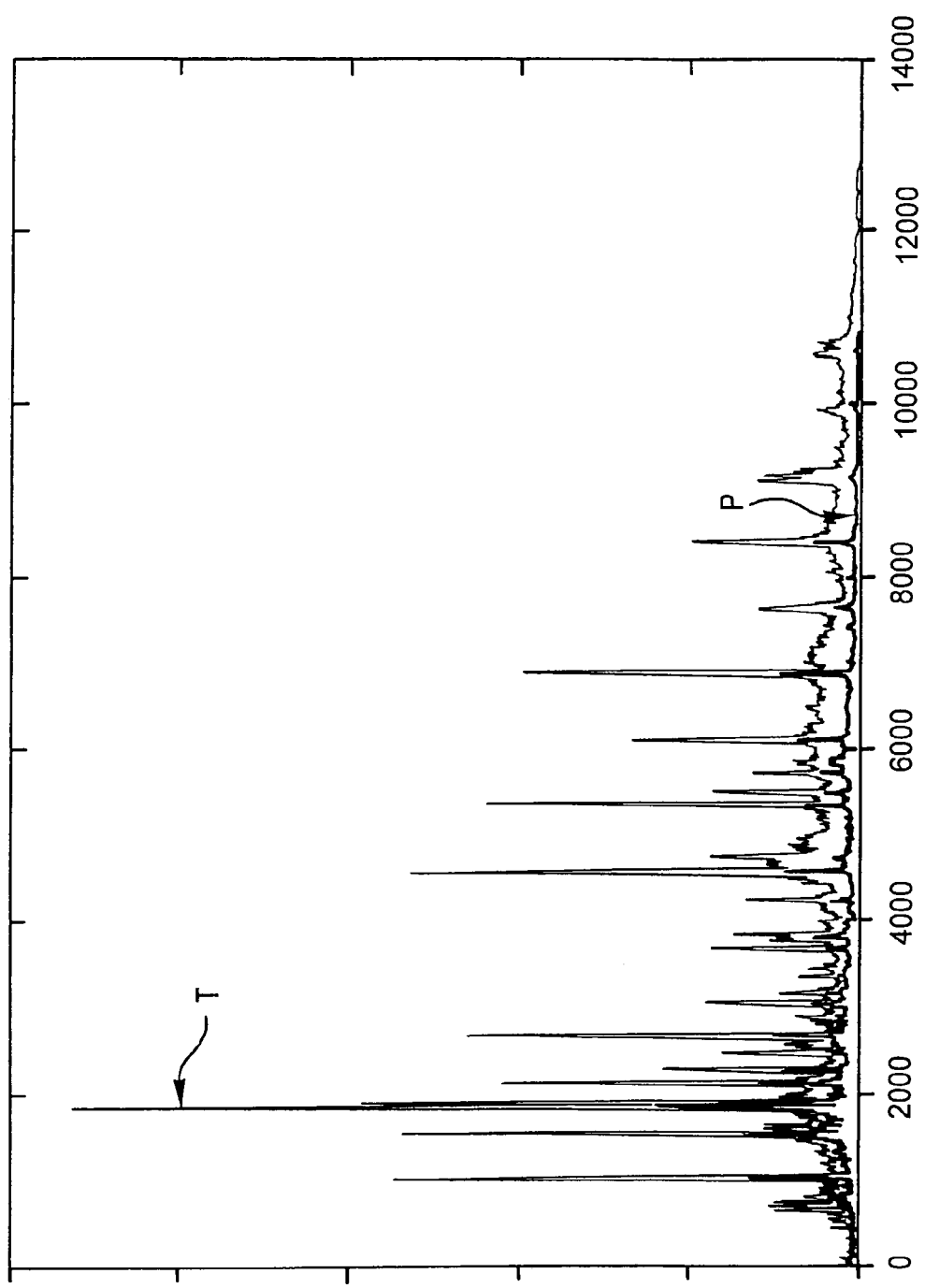

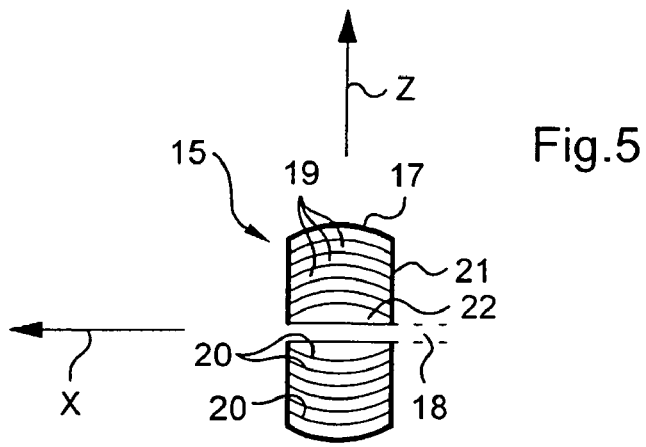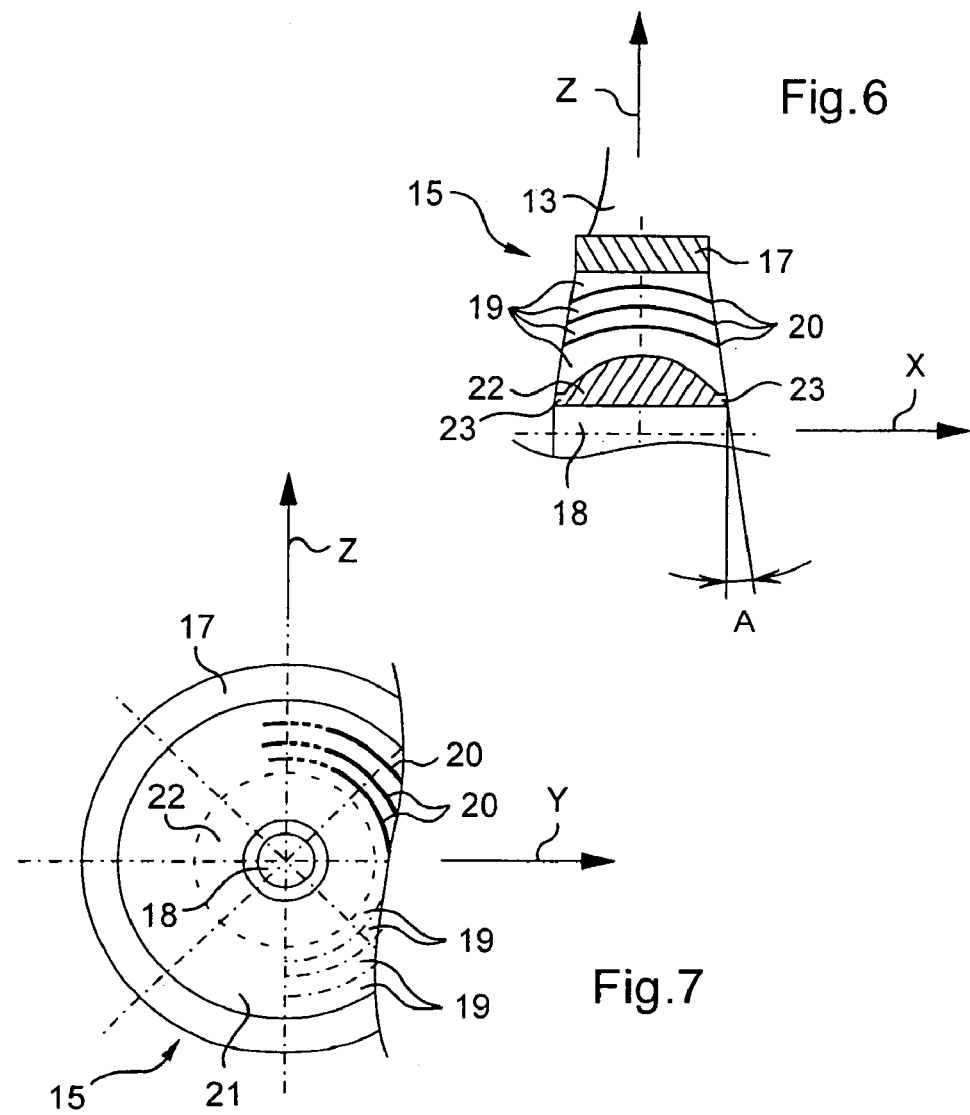

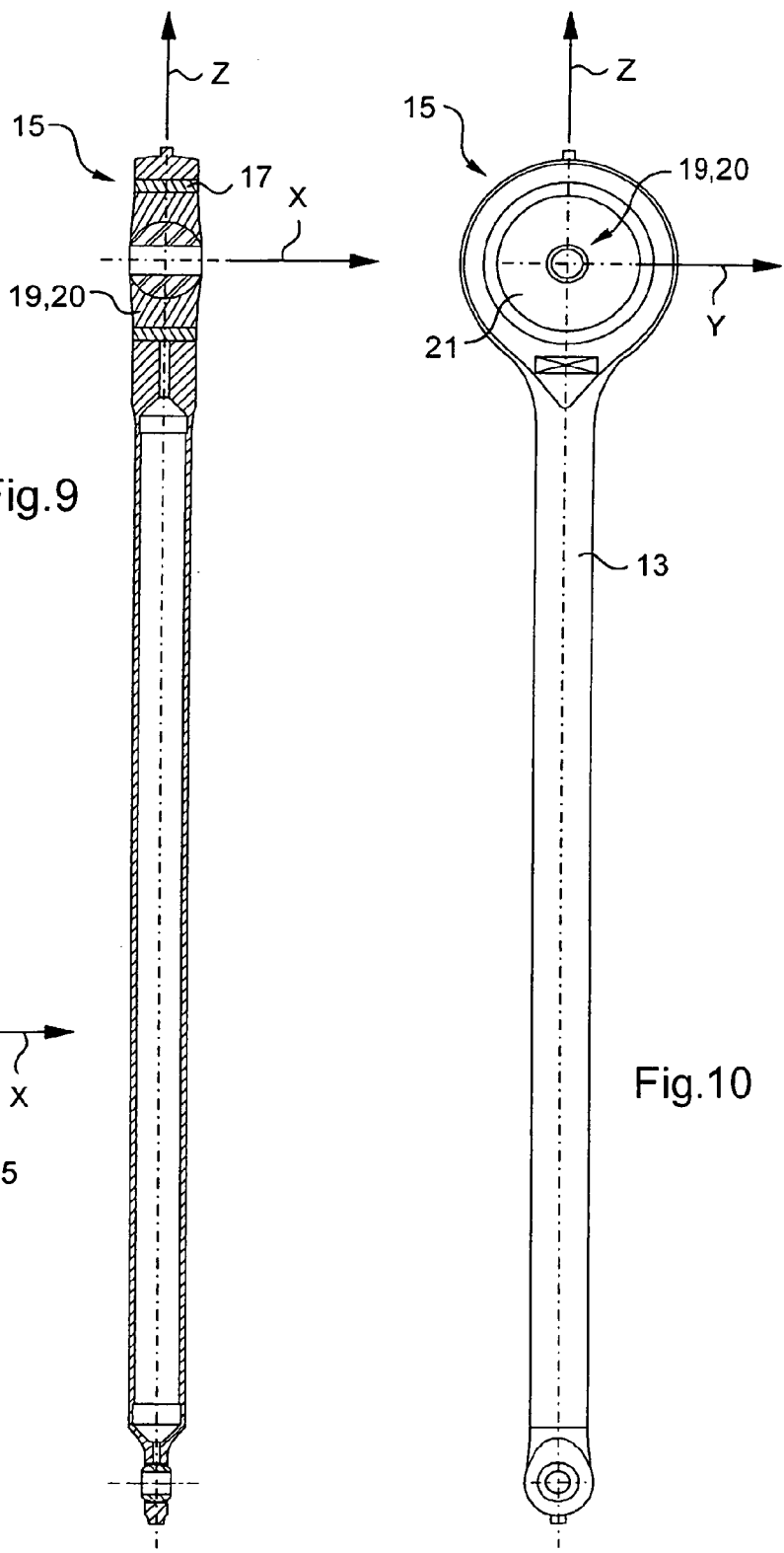

METHOD OF SELECTIVELY DECOUPLING SOLIDBORNE NOISE, A LAMINATED BALL JOINT, A MECHANICAL CONNECTION, AND AN AIRCRAFT

The invention relates in general to selective decoupling of solidborne noise and vibration as applied to a rotary wing aircraft.

BACKGROUND OF THE INVENTION

There follows an explanation of what is meant by the term "selective decoupling of solidborne noise".

Firstly concerning the concept of noise, it will be understood that the invention applies to the field of physical vibration and more particularly the range of audible sound.

Nevertheless, the term "noise" should be understood herein broadly, i.e. sometimes going beyond the spectrum of frequencies that can be perceived by the human ear, in other words the audible spectrum. In this respect mention is sometimes made of "high" frequencies.

Nevertheless, other ranges of vibration are sometimes also handled by the invention, on both sides of the audible spectrum. For example, the invention relates not only to ultrasound frequencies that can sometimes be troublesome (in particular for certain animals), but also to infrasound frequencies that contributes to the sound footprint of the aircraft.

The invention relates to the solidborne transfer of vibration. Two propagation paths for noise, e.g. in an aircraft, are commonly distinguished:

firstly the path whereby noise is radiated via various walls of the aircraft, with this noise path being known as "airborne" noise; and secondly noise can be transmitted from vibrating material to vibrating material, which means that each component that is vibrating constitutes an additional source of noise: this noise is referred to as "solidborne" noise.

Finally, there follows an explanation of the concept of decoupling. The decoupling to which the present application applies seeks to reduce the transfer of solidborne vibration. By analogy, it is somewhat similar to what happens in a lowpass filter.

OBJECTS AND SUMMARY OF THE INVENTION

Thus, a first object of the invention is to improve the comfort of the occupants of an aircraft such as a helicopter. Secondly, it seeks overall to reduce the noise from the aircraft, whether it is perceived inside the aircraft or outside it.

For this purpose, the invention acts on a mechanical connection connecting a power transmission gearbox, e.g. a main transmission gearbox (MTG), to a force transmission structure of a rotary wing aircraft.

It should be observed that the invention applies to transmission gearboxes of types other than those known as main gearboxes, in particular in aircraft provided with a plurality of lift and propulsion rotors, with at least some of them having their own gearboxes.

In any event, a large portion of the noise in such aircraft comes initially from such gearboxes.

For example, if consideration is given to the main transmission gearbox, it is mounted between an engine unit such as one or more turbines and a main rotor which serves to provide the aircraft with lift and propulsion to make it advance.

The gearbox is placed so that its general axis is substantially parallel to a rotor mast. It is suspended by MTG suspension bars relative to a force transmission (i.e. load bearing) structure of the aircraft.

It is found in practice that the gearbox is subjected to high levels of vibration in addition to that which is generated by the rotor driven by said gearbox.

Thus, the vibration perceived in flight inside an aircraft such an EC155 (Dauphin) helicopter includes gearing spectrum lines generated by the gearwheels of the gearbox. For example, these gearing spectrum lines present high amplitudes at frequencies around a few hertz (Hz), 2000 Hz, 4000 Hz, and 6000 Hz, in particular.

Surprisingly, it has been found that in a range of aircraft possessing substantially similar engine and transmission units, the noise for decoupling generally presents high amplitudes at the same frequencies. As a result, the analysis performed for any one given type of aircraft is often applicable, at least in outline, to a plurality of different aircrafts in the range.

Still while in flight on board such an aircraft, acceleration spectra are observed in the gearbox suspension bars, essentially in the range 1000 Hz to 7000 Hz for the major spectra (see FIG. 4). When comparing the acceleration spectra measured at the head (top curve T) of the suspension bar and at its foot (bottom curve P), it can be seen that there is a certain amount of attenuation, in particular below 1000 Hz and above 3500 Hz.

Nevertheless, the acceleration spectra in suspension bars are attenuated very little in the range 1000 Hz to 3500 Hz.

Such accelerations and vibrations are particularly harmful since they are liable in particular to limit the maximum speed of the aircraft, to weaken its structural strength, and to affect the comfort of its occupants.

Consequently, it is appropriate to oppose transmission of such vibration from the main gearbox to the force transmission structure as much as possible in order to avoid premature wear of the elements that are subjected to said vibration or acceleration, and to make the cockpit and the passenger cabin of the aircraft comfortable.

However, in the field of aircraft, questions of dimensioning are particularly constricted because of the imposed safety and standards requirements.

The invention thus stemmed initially from using finite elements to model the connection between the gearbox and the load-carrying structure.

With given longitudinal mean stiffness for each type of suspension bar, it was possible to deduce the natural modes in longitudinal traction/compression stress that lie in the vicinity of 3000 Hz, 6000 Hz, and 9000 Hz.

These values for the natural modes of the suspension bars in traction/compression are offset towards low frequencies and attenuated at high frequencies if additional stiffness is added at the root of a bar.

On the basis of those observations, the invention then stemmed from determining parameters for decoupling the solidborne noise and vibration that is to be filtered, so that the region in which amplification occurs is as small as possible, while the region in which attenuation occurs is as large as possible, at a first natural frequency (e.g. below 1300 Hz).

From the above, it was deduced that a system in the form of a laminated ball joint could provide the desired decoupling of solidborne noise and vibration, in particular by dedicating shape, dimension, and physical-property parameters of the components of the ball joint to such-and-such a range of frequencies to be filtered.

For this purpose, "contextual" data was taken into account. Depending on circumstances, the contextual data was selected from the following:

the static stiffness of the laminated components of the ball joint;

the dynamic stiffness of the laminated components of the ball joint;

the damping of the laminated components of the ball joint;

the maximum acceptable static forces;

the maximum acceptable dynamic forces;

criteria concerning longevity and ability to withstand fatigue;

certification requirements;

the maximum acceptable displacements of the components;

the maximum acceptable misalignments of the components;

the size and the weights of the components;

abilities to withstand fire and chemical attack; and cost.

From the above, it was possible to conclude that it is appropriate to begin by determining at least one frequency band in which to take action, i.e. 1000 Hz to 3000 Hz in the above example.

In practical approaches, the frequency band is selected to be from 500 Hz to 4000 Hz, while taking care that low frequency displacements (e.g. in the range 0 to 100 Hz) of the suspension bar relative to each of its anchor points are also functionally provided for.

Given this frequency band for decoupling, it is then the shape, dimension, and physical-property parameters of the components of the laminated ball joint that are determined.

For example, an approximate value is then determined for the stiffness of an elastomer layer of the ball joint (e.g. $3 \times 10^7$ newtons per millimeter (N/mm), with a static loading context of about 30000 N per suspension bar, a maximum operating temperature of about 80° C., and elongation of the order of 0.3 millimeters (mm) to 1 mm, and with acceptable angular deflection of about ±1°).

In one embodiment, a radial stiffness of about $25 \times 10^6$ N/mm to $35 \times 10^6$ N/mm is given overall to the laminated ball joint, for static axial stiffness of about 600 N/mm to 700 N/mm.

It is because of the above that the decoupling of solidborne noise and vibration is said to be "selective", in the sense that the "high frequency" noise is filtered by the laminated ball joint between the suspension bar and either the force transmission structure or the case of the main transmission gearbox, with this being achieved in the invention by means of the parameters of at least one of two laminated layers of said ball joint being dedicated to at least one frequency range.

At this stage, but without going into the detail of the invention, it can be understood that the dedicated decoupling parameters relate (in terms of values, materials specifications, configurations, etc.) to various aspects of the laminated ball joint, such as those specified below:

concerning the overall structure of the ball joint:

the local shapes of the outer cage of the ball joint: for example whether it is provided with a confinement casing that protects it against aggressive atmospheres; and the dimensions of said outer cage: e.g. in order to obtain large decoupling areas, with it being possible to over-dimension the outer cage relative to mechanical and standards requirements; and relating to the internal configuration of the ball joint:

the numbers of dedicated flexible and rigid layers;

the shape of each of said dedicated layers (spherical, bullet-shaped, etc.);

the dimensions and the thicknesses of each of said dedicated layers;

the dynamic and acoustic properties of each of said dedicated layers;

the allocation of frequencies to be filtered by each of said dedicated layers; and the materials specific to each of the dedicated layers.

Sometimes, the decoupling of the invention is combined with:

prefiltering within the bar (e.g. in accordance with the teaching of French patent document 2 815 603); and prefiltering within the strap of the laminated ball joint (e.g. in accordance with the teaching of U.S. Pat. No. 2,417, 347); and pre/post-filtering between the mounting fitting of a ball joint and the force transmission structure and/or the gearbox case.

Mention is made below of documents relating to selective vibratory decoupling of helicopter gearbox noise.

French patents documents 2 499 505 and 2 669 982 describe suspension devices for the main transmission gearbox of a helicopter that are particularly effective in reducing the vibration generated by the lift and propulsion rotor. The bearing or fastening bars or parts are distributed radially around the transmission gearbox. Their top ends are connected to the top portion of the gearbox and their bottom ends are hinged to suspension blades or to the fuselage.

Optionally, a suspension system connects the bottom portion of the gearbox to the aircraft fuselage and includes suspension blades that are distributed radially around the gearbox in a plane that is substantially orthogonal to the axis of the rotor, having radially inner ends secured to the bottom gearbox of the gearbox and radially outer ends hinged to the fuselage.

Resonator means associated with respective bearing parts, either at their bottom ends (FR 2 499 505) or at their top ends (FR 2 669 982) serve essentially to reduce the transmission of rotor vibration by said bearing parts.

French patent document 2 787 161 describes an anti-vibration device for reducing the vibration transferred by a gearbox suspension of a rotary wing aircraft. An elastic annular element and resonator means are interposed in the middle of the bar. The vibration produces alternating rotary motion and the resonator means generates an anti-vibratory inertial force opposing said vibration and reducing the amount of vibration that is transferred.

French patent document 2 815 593 describes a connection ball joint for an anti-roll bar of a land vehicle. That ball joint seeks to filter vibration of small amplitude, which is something that is not achieved correctly by lubricated ball joints which are also noisy, fragile, and allow for insufficient angular deflections, according to that document FR 2 815 593. For this purpose, the ball joint has a laminated structure with flexible layers and rigid layers that are prestressed and enclosed between two welded sleeves. The laminated layers appear to be of small and uniform thickness.

French patent document 2 474 996 describes an anti-resonant suspension device for a suspension for a helicopter main transmission. That device has ball joints with flexible inserts for transmitting the forces coming from a sloping bar for connecting a main gearbox to a fuselage structure of the helicopter. One of those joints is placed on an anchor crank rocker remote from the hinge of the bar and includes a laminated layer surrounding the ball joint axis, possessing two concentric elastomer layers separated by an intermediate ring.

French patent document 2 807 810 describes a suspension for a transmission gearbox of a rotary wing aircraft having a damper structure with an internal recess filled with an aggregate of solid bodies.

French patent document 2 815 603 describes a soundproofing panel comprising two opposite plates defining a closed inside space in which an aggregate of solid bodies come into contact, completely filling said space.

U.S. Pat. No. 2,417,347 describes damper apparatus operating at given frequencies or vibrations ranges for an aircraft. Cages of cylindrical shape with rod housings are filled almost completely with a material constituted by rather bulky particles, so as to damp vibration by dissipating heat.

U.S. Pat. No. 4,781,363 describes an anti-vibration device having primary and secondary fluid chambers for mounting between the main transmission gearbox and the fuselage of a helicopter in order to reduce the transmission of vibration between them.

U.S. Pat. No. 5,523,530 describes insulating materials for filtering the high frequencies generated by gearing noise, the major source of sound nuisance in the cabin of a helicopter. For this purpose, provision is made for a ball joint having laminated layers (claim 4) to be interposed in order to filter said high frequencies, directly between a gearbox case and a structural frame of the aircraft.

U.S. Pat. No. 5,902,050 describes a spherical bearing with a prestressed elastomeric element for providing isolation against vibration and sound. The spherical bearing of that document U.S. Pat. No. 5,902,050 is for cable junctions or clutch connections in trucks or tractors. In the figures, a prestressed spherical elastomer ring is assembled firstly to a metal inner core and secondly to a plastics outer member which is itself enclosed in a housing at the end of a rod.

However those documents do not propose a concrete and optimum solution for attenuating or even making imperceptible solidborne high frequency noise passing via suspension bars of a main gearbox of a rotary wing aircraft.

The invention seeks specifically to solve those problems. Amongst other things, it proposes selective decoupling of solidborne noise and vibration applied to a rotary wing aircraft, that is capable of being in particular:

entirely mechanical, without any electronic system;
fail-safe in implementation;
suitable for achieving selective filtering at a level close to 100%;
light in weight, compact, reliable, and long-lasting;
without risk: no unacceptable impact on the aircraft (critical parts);
in compliance with the applicable certification and/or standards requirements; and
highly integrated.

To this end, in one aspect, the invention provides a method of decoupling solidborne noise and vibration applied to a rotary wing aircraft in a laminated ball joint between firstly a suspension bar and secondly a force transmission structure and/or a case of a transmission gearbox of the aircraft, the method comprising at least the step of preparing a laminated ball joint comprising at least an outer strap and a junction shaft for anchoring the ball joint respectively to the force transmission structure or to a transmission gearbox case, and at least two damper layers and an interleaved rigid layer.

According to the invention, a determination step prior to the preparation step provides for determining at least one frequency band for decoupling in the range 0 to 7000 Hz, the step of preparing the laminated ball joint including a frequency allocation stage.

This allocation stage provides for at least two of the damper layers and/or at least one interleaved rigid layer to be selected respectively for dedication to at least a determined frequency band (for example only one or more determined frequency band(s)), by imposing shape and/or dimension and/or physical-property parameters on said layers, said imposed parameters being such that said layers perform selective decoupling, at least one frequency of the determined band.

In an implementation, the step of preparing the laminated ball joint comprises a stage of modeling at least the ball joint by finite elements, and then a step of prior evaluation of at least one of the decoupling parameters of the damper layers and/or the rigid layers by using finite elements, with an attenuation value that is as large as possible as obtained in this way for the first natural frequency of the laminated ball joint being used during the frequency allocation stage in order to actually compute the parameters imposed on the layers.

In an implementation, the step of preparing the laminated ball joint includes at least one stage of integrating contextual data selected from: the static stiffness of the components; the dynamic stiffness of the components; the damping of the components; the maximum acceptable static forces; the maximum acceptable dynamic forces; criteria concerning longevity and ability to withstand fatigue; certification requirements; maximum acceptable displacements for the components; maximum acceptable misalignments for the components; and the sizes and/or weights of the components.

In an implementation, the step of preparing the laminated ball joint comprises, e.g. during the frequency allocation stage, at least one stage of computing parameters:

for local shapes of the outer strap of the ball joint, e.g. provided with a confinement casing protecting the damper layers and/or rigid layers against aggressive atmospheres; and/or for dimensions of said outer strap, e.g. in order to obtain large decoupling areas, by overdimensioning the strap relative to mechanical and/or standards and/or certification requirements.

In an implementation, the step of preparing the laminated ball joint comprises at least one stage of deciding:

the numbers of dedicated elastomer layers and thus of interposed rigid layers; and
the shape of each of the dedicated layers, e.g. spherical, bullet-shaped; and
the dimensions and the thickness of each of the dedicated layers; and
the materials specific to each of the dedicated layers.

In an implementation, the determination step also includes a stage in which at least one additional frequency band for decoupling is determined, in spectra that are not audible to humans, e.g. in ultrasound or intrasound spectra.

The invention also provides a laminated ball joint for decoupling solidborne noise in a rotary wing aircraft, the ball joint being for providing a hinge connection between firstly a suspension bar and secondly a force transmission structure and/or a case of a transmission gearbox of the aircraft.

Said ball joint comprises at least firstly an outer strap and a junction shaft, the strap and the shaft serving to anchor the ball joint respectively to the force transmission structure or to a gearbox casing, and secondly two damper layers and an interleaved rigid layer.

According to the invention, the ball joint includes at least two damper layers and/or at least one rigid layer that are respectively arranged to be dedicated to a frequency band for decoupling lying in the range 0 to 7000 Hz, said layers presenting shape and/or dimension and/or physical-property parameters that are imposed to provide selective decoupling at least one frequency of the determined band.

For example, the transmission gearbox is a main gearbox whereby a main rotor for providing drive and lift is rotated.

In an embodiment, the laminated ball joint presents parameters selected from: the static stiffness of its components; the dynamic stiffness of its components; the damping of its components; the maximum acceptable static loads; the maximum acceptable dynamic loads; criteria concerning longevity and ability to withstand fatigue; certification requirements; maximum acceptable displacements for the components; maximum acceptable misalignments for the components; and the sizes and/or weights of the components.

In an embodiment, the laminated ball joint presents parameters selected firstly from local shapes for the outer strap (e.g. said strap is provided with a confinement casing protecting the damper layers and/or the rigid layers against aggressive atmospheres), and/or secondly from dimensions of said strap (e.g. such that the damper layers and/or the rigid layers possess extended decoupling surfaces that are overdimensioned relative to mechanical and/or standards and/or certification requirements).

In an embodiment, the laminated ball joint presents in section in longitudinal elevation, an outer profile that is substantially oval in shape, e.g. having an inner core for receiving the junction shaft with an outline that is substantially spherical and having an outer axial rim projecting from the spherical outline.

In an embodiment, the laminated ball joint has a receiver outer strap of substantially rectangular section, e.g. possessing an axial dimension that is smaller than the corresponding dimension of an inner core for receiving the junction shaft.

In an embodiment, the laminated ball joint has at least three dedicated damper layers of elastomer or the like, e.g. having an outline possessing a rectilinear edge that forms an angle of about 5° to 15°, and in particular that is about 10°.

In an embodiment, the laminated ball joint includes at least three rigid layers of high-alloy stainless steel, e.g. a precipitation-hardened steel alloyed in particular with chromium (11% to 18% by weight), nickel, and copper.

In an embodiment, the materials of the damper layers and of the rigid layers are suitable for presenting properties that are compatible with the maximum constraints expected for the laminated ball joint, up to a temperature of about −50° C. (minus fifty degrees Celsius) to +110° C., in particular +80° C.

In an embodiment, the laminated ball joint is prepared using the decoupling method as mentioned above.

The invention also provides a mechanical connection for selective decoupling of solidborne noise and vibration for a rotary wing aircraft between a transmission gearbox and a destination force transmission structure. The connection comprising at least three suspension bars extending in a downwardly-flared configuration in the elevation direction, together with at least two devices against negative torque.

In this connection of the invention, at least one suspension bar includes a laminated ball joint at least one of its ends hinged to the transmission gearbox and/or to the force transmission structure, said laminated ball joint being as mentioned above and/or being prepared in application of the decoupling method as mentioned above.

In an embodiment, each of the suspension bars of the mechanical connection is provided with a laminated ball joint, e.g. interposed between each of the ends hinged to the force transmission structure and an anchoring fitting of said structure.

In an embodiment, the outer strap of the laminated ball joint is welded to the end of the suspension bar.

For example, this may be done by electron beam welding.

In an embodiment, the junction shaft of the laminated ball joint is connected to the fitting by screw fastening or the like, e.g. said fitting comprising a pair of plates for connection to the junction shaft interconnected by a web for fastening to an anchoring soleplate provided with releasable assembly means disposed in at least two intersecting planes, at least one of which is placed against the force transmission structure.

The invention also provides a rotary wing aircraft such as a helicopter of the type suitable for implementing the method and/or using a laminated ball joint and/or including a mechanical connection as mentioned above.

BRIEF DESCRIPTION OF THE DRAWINGS

The invention is described below with reference to embodiments given in non-limiting manner and shown in the accompanying drawings, in which:

FIG. 1 is a cutaway diagrammatic view in axial perspective from above showing a rotary wing aircraft in accordance with the invention, specifically a helicopter, shown seen from the side with its front end or "nose" to the left and its rear end or "tail" to the right;

FIG. 2 is a simplified diagrammatic plan view seen from above showing a surface for receiving a base of a main transmission gearbox (MTG) casing on a force transmission structure of a helicopter, with two devices against negative torque;

FIG. 3 is a fragmentary diagrammatic view in elevation perspective from the side showing a main transmission gearbox (MTG) on a force transmission structure, with a mechanical connection and laminated ball joints in accordance with the invention;

FIG. 4 is a plot showing acceleration spectra in suspension bars as measured respectively at the top and at the bottom of said bars (top curve T, bottom curve P), showing attenuation below 1000 Hz at above 3500 Hz; in this plot, the abscissa gives frequency in Hz while the ordinate gives acceleration values;

FIG. 5 is an axial section view in elevation of a laminated ball joint in accordance with the invention, together with a confinement casing;

FIG. 6 is a fragmentary view in elevation axial section of an embodiment of a laminated ball joint of the invention having an external profile that is substantially oval or flared from the outer strap towards the axis of the junction;

FIG. 7 is a fragmentary transverse elevation view of the FIG. 6 laminated ball joint;

FIG. 8 is a view from the bottom end of a mechanical connection having a suspension bar and a laminated ball joint of the invention, shown in an axial plane (containing the longitudinal direction X and the radial or transverse direction Y);

FIG. 9 is a longitudinal section view in elevation showing the FIG. 8 connection with the laminated ball joint that is to occupy the bottom position in a fitting secured to a force transmission structure placed at the top; and FIG. 10 is a face view in a transverse and elevation plane (Y, Z) of the connection shown in FIGS. 8 and 9.

MORE DETAILED DESCRIPTION

There follows a description of embodiments of the invention.

In the drawings, where similar elements are designated by the same reference numerals, there are also shown three mutual orthogonal directions.

An "elevation" direction Z corresponds to the height and the thickness of structures in the position in which they are described: terms such as up/down or bottom/top are relative thereto. For simplification purposes, this elevation direction Z is sometimes said to be vertical.

Another direction X is said to be axial, and corresponds to the long or main dimensions of the structures in the position in which they are described. Terms such as front/rear are relative thereto. For simplification purposes, this axial direction X is sometimes said to be horizontal.

Yet another direction Y is said to be "transverse", and corresponds to the width or lateral direction of the structures in the position in which they are described. The term "side" is relative thereto. For simplification purposes, this transverse direction Y is sometimes also considered as being horizontal.

In FIG. 1, reference 1 is an overall reference to a rotary wing aircraft. Specifically, the aircraft 1 is a helicopter.

Together the directions X and Y define a "main" (X, Y) plane within which the support polygon and a landing plane for the aircraft 1 are typically inscribed.

As mentioned above, the blades 2 of the main rotor 3 for providing the helicopter 1 with propulsion and lift are driven by a main transmission gearbox (MTG) 4 which is constrained to rotate a mast 5 of the main rotor 3.

In addition, the aircraft 1 of FIG. 1 possesses an anti-torque rotor 6 also connected to the gearbox 4 and provided with blades.

Like the main rotor 3, the rotor 6 is driven in normal operation by a drive unit (not shown), e.g. comprising one or more turbines. The drive unit is functionally connected to the gearbox 4 (MTG).

FIGS. 2 and 3 show one way in which a main transmission gearbox 4 can be mounted on a force transmission structure 7 of the aircraft 1. Typically, this structure 7 forms part of a top transmission support platform.

At the base 8 of a case 9 of the gearbox 4, mounting is performed on an anchor surface via diametrically opposite pairs of devices 10 against negative torque (diametrically opposite about an elevation axis perpendicular to the X, Y plane), each of said devices being provided with an adjustable stop 11 and torque buffers 12.

Furthermore, the main gearbox 4 is connected to the force transmission structure 7 by suspension bars 13. There are four of these suspension bars 13 in FIG. 2.

In one configuration, two suspension bars 13 extend from a front portion at the top of the (conical) case 9 (to the left in FIG. 3), down to the force transmission structure 7 of the aircraft 1.

These front bars 13 are disposed at a vertical stabilization angle (measured in an elevation plane including the axial mid-fiber of the bar), which is smaller than the corresponding angle for the other two bars 13 which are rear bars.

In other words, the suspension bars 13 at the front slope less steeply relative to the longitudinal direction X or the transverse direction Y than do the rear bars 13.

However, it can be seen in FIG. 3, that the suspension bars 13 at the rear are more widely spread apart from each other (in projection onto the X,Y plane) than are the front bars 13.

In FIG. 3, each suspension bar 13 is connected firstly via a pivot hinge to a tab 14 of the conical case of the main gearbox 4. This forms the top anchor of each suspension bar 13 of the MTG.

It should be observed that a mechanical connection 16 between the main transmission gearbox 4 and the force transmission structure 7 includes the components 10 to 14 as mentioned above.

Furthermore, although the example of FIG. 1 shows a helicopter where the decoupling is applied to the suspension for the main gearbox 4, the invention is not limited to this example.

On the contrary, the invention can also be used in other aircrafts 1 and with other types of suspension for transmission gearboxes, and they need not necessarily be main gearboxes.

The connection 16, and more precisely the bottom anchors of the suspension bars 13 further include respective laminated ball joints 15 of the invention for decoupling solidborne noise.

Thus, each ball joint 15 does not serve solely to provide a hinge connection between a suspension bar 13 and the force transmission structure 7 and/or the case 9 of the main transmission gearbox 4 of the aircraft 1.

Such a ball joint 15 comprises in particular:
an outer strap 17; and
a junction shaft 18.

The strap 17 and the shaft 18 serve to anchor a suspension bar 13 either to the structure 7 (bottom mounting) or to the case 9 of the gearbox 4 (top mounting).

In addition, it can be seen from FIGS. 5 to 7 that the ball joint 15 possesses between the strap 17 and the shaft 18 at least two damper layers 19 together with at least one interleaved rigid layer 20.

In an embodiment, the layers 19 and 20 form an assembly that is secured to the strap 17 by crimping in a press.

In FIG. 5, the example laminated ball joint 15 comprises six damper layers 19 and thus five interleaved layers 20. In this example, each damper layer 19 is dedicated to one of the frequency bands that is to be decoupled in this embodiment, i.e. about and around 600 Hz, 1000 Hz, 1500 Hz, 2300 Hz, 2800 Hz, or 6000 Hz.

The layers 19 and also the interleaved rigid layers 20 act in this example as resonators in the manner explained in French patents documents 2 499 505 or 2 669 982.

Parameters concerning the shapes, the dimensions, and the physical properties of the damper layers 19 and also of the rigid layers 20 are determined while designing the ball joint 15 so as to obtain selective decoupling at the frequencies in the selected bands.

In FIG. 6, the example ball joint 15 has four damper layers 19 and three interleaved layers 20. These layers 19 and 20 are arranged so as to be dedicated to frequency bands for decoupling in the range 0 to 7000 Hz, e.g. in the range 0 to 4000 Hz.

In embodiments, the layers 19 and 20 present shape parameters such as damper or dissipater areas that are optimized, in particular in terms of dimensions.

Similarly, their physical properties are determined as a function of the frequency bands to which the damper layers 19 and the rigid layers 20 are dedicated.

In an example, the layers 19 are made of elastomer material, possibly filled with particles or inserts, so as to perform selective decoupling in the selected frequency bands. The rigid layers 20 in the same embodiment are made of stainless steel presenting in combination good properties of ductility and of withstanding forces along the Z and Y axes and also transverse forces along the X axis.

In embodiments, the ball joint 15 presents parameters selected as a function of data such as:
the static stiffness of its layers (19, 20); and/or
the dynamic stiffness of its layers (19, 20); and/or
the damping of its layers (19, 20); and/or the static forces acceptable by its layers (19, 20); and/or the maximum dynamic forces (for the layers 19, 20); and/or the longevity criteria and resistance to fatigue of the ball joint 15; and/or the certification requirements for the suspension bar 13; and/or the maximum acceptable displacements (between 17 and 18); and/or the maximum acceptable misalignments (between 17 and 18); and/or the ability to withstand fire and chemical attack; and/or the overall size and/or weight of each ball joint 15, in particular.

It is specified at this point that concerning chemical attack, certification criteria standards require the ability to withstand engine oils, vapors from such oils, and fuel gases, in particular.

In an embodiment, the laminated ball joint 15 presents parameters selected from:

local shapes for the outer strap 17: for example the strap 17 may be provided with a confinement casing 21 (FIG. 5) protecting the damper layers 19 and the rigid layers 20 against aggressive atmospheres; and/or the dimensions of the components of the ball joint 15.

For example, the layers 19 and 20 are arranged with a shape having a concave side (e.g. a toroidal shape of curvilinear section or of zigzag line section) facing towards the junction shaft 18 (i.e. radially towards the inside of the ball joint 15, and thus in elevation in FIGS. 5 to 7).

Thus, the layers 19 and 20 present surfaces of large area for providing decoupling, because they are overdimensioned relative to the requirements for the ball joint 15 in mechanical and/or standards and/or certification terms.

In FIG. 6, the ball joint 15 presents a longitudinal section in elevation having an outer profile that is substantially oval.

More particularly, the ball joint 15 possesses an inner core 22 which receives the junction shaft 18. The outline of the core 22 is substantially spherical and presents an outer axial rim 23 projecting from the so-called spherical outline 22 from each of its longitudinal ends (X axis).

For example, a cheekplate of the confinement casing 21 can be sealed on the inside against such a rim 23.

Still with reference to FIG. 6, the ball joint 15 presents an outer strap 17 of section that is substantially rectangular (when seen in the longitudinal elevation plane X, Z). In this example, an axial dimension of said strap 17 is smaller, i.e. shorter, than a corresponding dimension of the inner core 22. In other words, the core and thus a portion of the layers 19 and 20 of said ball joint 15 project longitudinally relative to the strap 17.

In this embodiment, the ball joint 15 has at least three dedicated damper layers 19, made of elastomer, of outline forming an extended rectilinear edge presenting an angle A of about 5° to 15°, and in particular equal to about 10°.

In an example, the material of the damper layers 19 is selected to provide the selected parameters in terms of static stiffness, with an imposed value of about 30,000 N/mm in the elevation direction (Z).

Thus, the axial stiffness (in the longitudinal direction X) is less than 4000 N/mm, e.g. lying in the range 2900 N/mm to 3500 N/mm, and in particular is less than 3200 N/mm.

In other embodiments, stiffness values of the order of 10,000 N/mm to 8000 N/mm are to be found, for example depending on the type of aircraft 1, whether it is a light aircraft (such as the EC120 Colibri helicopter) or a heavy aircraft (such as the AS332 Super Puma helicopter).

Stiffness in twisting has some effect on selecting the parameters of the layers 19, in order to ensure that it is about 5 newton meters per degree (Nm/°) to 15 Nm/°, e.g. 8 Nm/° to 12 Nm/°, and in particular 10 Nm°.

This laminated ball joint 15 also has three rigid layers 20, specifically made of high-alloy stainless steel. In this example, this is precipitation-hardened steel being alloyed in particular with chromium (11% to 18% by weight), nickel, and copper.

Furthermore, the materials of the damper layers 19 and to a small extent of the rigid layers 20, are selected so as to be compatible with the maximum thermal stresses expected for the ball joint 15. For example, the materials should be compatible with the requirements imposed on such a ball joint 15 covering a temperature range of about −50° C. to +110° C., or at least to +80° C.

With the structure of the ball joint 15 described above, there follows a broader description of the mechanical connection with decoupling of solidborne noise of the invention used for connecting the main transmission gearbox 4 to the force transmission structure 7 of the aircraft 1.

In general, this connection comprises at least three suspension bars 13.

In the example of FIG. 3, this connection actually possesses four bars 13 that extend in a downwardly-flared configuration relative to the elevation direction Z, together with two devices 10 against negative torque.

In FIG. 3, each suspension bar 13 has a laminated ball joint 15 at its bottom hinge end, i.e. at its end hinged to the force transmission structure 7.

All of the suspension bars 13 of the mechanical connection are provided with a respective ball joint 15 interposed between its end for hinging to the force transmission structure 7 and an anchor fitting 24 of the structure 7.

More specifically, the junction shaft 18 of the ball joint 15 is connected by screw fastening or the like to the fitting 24. In this example, each fitting 24 comprises a pair of plates for connection to the shaft 18, and interconnected by a fastening web to an anchor soleplate provided with releasable assembly means disposed in at least two intersecting planes, one of which is placed against the force transmission structure 7.

In this embodiment, each outer strap 17 of a ball joint 15 is welded at 25 (FIG. 3) to the bottom end of the corresponding suspension bar 13. This is somewhat surprising since a connection, e.g. by screw fastening, should produce greater filtering from the ball joint than does such a weld 25. However welding is necessary in this example because of contextual data such as certification constraints.

In the embodiment of FIGS. 8 to 10, the assembly between the bar 13 and the strap 17 of the ball joint 15 is obtained by electron beam welding, in particular because of the higher strength qualities of that kind of welding compared with arc welding.

In other embodiments, only some of the bars 13 possesses a single ball joint 15, while other bars have a ball joint 15 placed at each end of the bar 13, i.e. at its bottom hinge end and also at its top hinge end connected to the case 9 of the gearbox 4 (conical in FIG. 3).

With the structure of the laminated ball joint 15 described in detail above, there follows a description of how it is designed in application of the decoupling method of the invention.

To summarize, the method includes at least a step of preparing a laminated ball joint 15 having at least one outer strap 17 and a junction shaft 18 for anchoring the ball joint 15 either to the force transmission structure 7 or to the case 9 of the main gearbox 4, together with at least two damper layers 19 and one interleaved rigid layer 20.

The invention provides for a "determination" step.

This step is performed before the preparation step and consists in determining at least one frequency band that is to be decoupled, e.g. lying in the range 0 to 7000 Hz.

Advantage can be taken of the above-mentioned observation whereby, within a range of aircraft 1 possessing transmission gearboxes 4 and engine units that are substantially similar, the noise for decoupling is generally at high amplitude at the same frequencies.

In certain embodiments of the invention, the determination carried out for a given type of aircraft is applicable to other aircraft 1 in the range.

In practice, it is sometimes possible with the invention for a single design of laminated ball joint 15 prepared as a function in particular of one model of aircraft 1 is entirely effective on other aircraft 1 in the same range. Naturally, strict compliance is verified and this is not taken for granted.

In examples, a plurality of frequency bands lying in the range 800 Hz to 4000 Hz result from this determination step.

Starting from this determination, the step of preparing the ball joint 15 further comprises a stage of allocating frequencies.

This frequency-allocation stage provides for at least two of the damper layers 19 and/or the interleaved layers 20 to be selected respectively so as to be dedicated to at least one of the determined frequency bands.

This imposes parameters concerning shape and/or dimensions and/or physical properties on said layers 19 and 20.

These imposed parameters are such that the layers 19 and 20 provide the desired selective decoupling at each frequency in the determined band.

For this purpose, the step of preparing the ball joint 15 generally comprises a finite element modeling stage, applied in particular to the ball joint 15. In some implementations, other components of the mechanical connection are also modeled in this way during this step.

Thereafter, there follows a prior evaluation step of at least one of the decoupling parameters of the layers 19 and/or 20, implemented using finite elements.

An attenuation value is thus obtained that is as broad as possible for a first natural frequency of the laminated ball joint 15. This first natural frequency is used during the frequency-allocation stage for actually calculating the imposed parameters for the layers. For example, the first natural frequency is lower than 1300 Hz.

As shown for assemblies of bars 13 and straps 17 of ball joints 15, one implementation provides for the step of preparing the ball joint 15 in particular, but often also the mechanical connection taken more generally, to include at least one stage of integrating contextual data.

Depending on circumstances, the contextual data is selected from the notions of static stiffness or dynamic stiffness, damping, and maximum acceptable forces.

Longevity criteria and ability to withstand fatigue, and also certification requirements are taken into account in certain applications. The maximum acceptable displacements of the components or the maximum acceptable misalignment of the components and also the size and/or the weight of the components making up the connection also form such contextual data in certain embodiments.

For example, the constraints imposed on an aircraft 1 of the invention can imply the use of contextual data involving weight limits for the ball joint 15, which must not exceed the weight of a conventional pivoting hinge (e.g. as replaced by the ball joint 15) by more than 1 kilogram (kg) or 2 kg.

It is also common practice to require a ball joint 15 to have a lifetime of the order of 1000 hours (h) to 6000 h of operation, e.g. about 3000 h.

In general, although not under all circumstances, the step of preparing the ball joint 15 includes, e.g. during the frequency allocation stage, at least one stage of calculating parameters for the ball joint 15 and/or the mechanical connection (local shapes and/or dimensions, in particular).

The step of preparing the ball joint 15 also includes a stage of deciding on the number of layers 19 (in this case elastomer layers) and on the number of dedicated rigid layers 20.

The decision stage generally makes it possible to determine the shape of each of the dedicated layers 19 or 20, and also their dimensions (in particular in terms of thickness).

As mentioned above, these parameters lead to selecting specific materials for each of the dedicated layers 19 and 20.

In a specific implementation, the determination step further includes a stage in which at least one additional frequency band for decoupling is determined in spectra that are not audible to humans, e.g. ultrasound or intrasound spectra.

This applies in particular to military missions which require a high level of discretion for the aircraft 1 of the invention, or indeed to circumstances in which the aircraft 1 needs to approach or even transport living beings that are sensitive to such ultrasound or intrasound frequencies.

In an example of preparing a laminated ball joint 15, the maximum loads applicable on the ball joint 15 are taken into consideration in terms of applied forces.

Some implementations provide for parameters of the ball joint 15 (in particular dimensional and strength-of-materials parameters) to be evaluated initially and then finally determined as a function of the maximum forces and/or displacements, both static and dynamic.

In contrast, in other implementations, these parameters of the ball joint 15 are not initially evaluated or computed as a function of maximum forces and/or displacements. For example more weight is given to data concerning the fatigue performance of the ball joint 15 under the effect of deformation due to dynamic constraints, in order to determine these parameters.

Concerning the contextual data, and in association with the above evaluations and/or computations of dimensioning and strength-of-materials parameters for the ball joint 15, certain implementations follow the same preparation step for all of the suspension bars 13 of a given aircraft 1.

In other implementations, distinct preparation steps are undertaken for a plurality of suspension bars 13 in a given aircraft 1.

On the same lines, the operating temperature of the laminated ball joint 15 should be predetermined and taken into consideration for evaluation and final computation of the parameters constituting said ball joint 15.

Depending on the location of the ball joint 15 within the aircraft 1, and also for example safety criteria that need to be complied with given the intended use of the aircraft 1, the temperature taken into consideration during evaluation and then final computation of the parameters defining the ball joint 15 (and of course its components) is taken for example to cover the range −50° C. to +110° C. Often this temperature is about +25° C. to +80° C. given the hot environment of the gearbox 4.

In the example mentioned where the dimensional and strength-of-materials parameters in particular of the laminated ball joint 15 are prepared as a function of fatigue constraints, a certain amount of weighting is performed considering a smaller maximum static force and a measured dynamic force between each axial end of the suspension bar 13 for which the parameters are calculated.

All of these parameters as evaluated and then computed during the preparation step are taken into consideration while ensuring overall that the laminated ball joint 15 presents a predetermined stiffness value.

For example, in an implementation, this predetermined stiffness value to be complied with is about 10,000 N/mm to 40,000 N/mm, e.g. approximately 30,000 N/mm for an aircraft 1 of the kind mentioned above.

Similarly, prior to computing the parameters that define its components, the ball joint 15 is initially subjected to limits relating to the displacements that are acceptable within a hinge.

In the above-mentioned example, the maximum authorized radial elongation (in this case along the elevation direction Z) is of the order of 1 mm, while the maximum acceptable angular deflection for the ball joint 15 is of the order ±1° (i.e. about 1° in each possible direction of rotation). It should also be observed that conventionally this deflection is measured between the strap 17 and the junction shaft 18.

Naturally, under no circumstances should this displacement damage the ball joint 15, and in particular it must not damage its damper layers 19.

What is claimed is:

1. A method of decoupling solidborne noise and vibration applied to a rotary wing aircraft (1) in a laminated ball joint (15) between firstly a suspension bar (13) and secondly a force transmission structure (7) and/or a case (9) of a transmission gearbox (4) of the aircraft (1), the method comprising at least the step of preparing the laminated ball joint (15) the ball joint comprising at least an outer strap (17) and a junction shaft (18) for anchoring the ball joint (15) respectively to the force transmission structure (7) or to a transmission gearbox case, and at least two damper layers (19) and an interleaved rigid layer (20), wherein a determination step prior to the preparation step provides for determining at least one frequency band for decoupling in the range 0 to 7000 Hz, the step of preparing the laminated ball joint (15) comprising a stage of allocating frequencies such that said frequency-allocation stage provides for at least two damper layers (19) and at least one interleaved rigid layer (20) to be selected respectively for dedication to at least a determined frequency band, by imposing on said layers (19, 20) shape and dimension and physical-property parameters, said imposed parameters being such that the layers (19, 20) perform selective decoupling at least one frequency of the determined band.

2. A method according to claim 1, wherein said step prior to the preparation step provides for determining at least one frequency band for decoupling lying in the range 0 to 4000 Hz.

3. The method according to claim 1, wherein the step of preparing the laminated ball joint (15) comprises a stage of modeling at least the ball joint (15) by finite elements, and then a step of prior evaluation of at least one of the decoupling parameters of the damper layers (19) and/or the rigid layers (20) by using finite elements, with an attenuation value that is as large as possible as obtained in this way for the first natural frequency of the laminated ball joint (15) being used during the frequency allocation stage in order to actually compute the parameters imposed on the layers (19, 20).

4. The method according to claim 1, wherein the step of preparing the laminated ball joint (15) includes at least one stage of integrating contextual data selected from: the static stiffness of the components; the dynamic stiffness of the components; the damping of the components; the maximum acceptable static forces; the maximum acceptable dynamic forces; criteria concerning longevity and ability to withstand fatigue; certification requirements; maximum acceptable displacements for the components; maximum acceptable misalignments for the components; and the sizes and weights of the components.

5. The method according to claim 1, wherein the step of preparing the laminated ball joint (15) comprises, during the frequency allocation stage, at least one stage of computing parameters:
for local shapes of the outer strap (17) of the ball joint (15), provided with a confinement casing (21) protecting the damper and rigid layers (19 and/or 20) against aggressive atmospheres; and
for dimensions of said outer strap (17), in order to obtain large decoupling areas, by overdimensioning the strap (17) relative to mechanical and standards requirements.

6. The method according to claim 1, wherein the step of preparing the laminated ball joint (15) comprises at least one stage of deciding:
the numbers of dedicated elastomer layers (19) and thus of interposed rigid layers; and
the shape of each of the dedicated layers (19, 20), spherical, bullet-shaped; and
the dimensions and the thickness of each of the dedicated layers (19, 20); and
the materials specific to each of the dedicated layers (19, 20).

7. The method according to claim 1, wherein the determination step also includes a stage in which at least one additional frequency band for decoupling is determined, in spectra that are not audible to humans, in ultrasound or intrasound spectra.

8. The laminated ball joint (15) for decoupling solidborne noise in a rotary wing aircraft, the ball joint (15) being for providing a hinge connection between firstly a suspension bar (13) and secondly a force transmission structure (7) and/or a case (9) of a transmission gearbox (4) of the aircraft, said ball joint (15) comprising at least firstly an outer strap (17) and a junction shaft, the strap (17) and the shaft serving to anchor the ball joint (15) respectively to the force transmission structure (7) or to a gearbox casing (9), and secondly two damper layers (19) and an interleaved rigid layer (20), the ball joint (15) including at least two damper layers (19) and at least one rigid layer that are respectively arranged to be dedicated to at least a frequency band for decoupling lying in the range 0 to 7000 Hz, said layers presenting shape and dimension and/or physical-property parameters that are imposed to provide selective decoupling at least one frequency of the determined band.

9. The ball joint (15) according to claim 8, presenting parameters selected from: the static stiffness of its components; the dynamic stiffness of its components; the damping of its components; the maximum acceptable static loads; the maximum acceptable dynamic loads; criteria concerning longevity and ability to withstand fatigue; certification requirements; maximum acceptable displacements for the components; maximum acceptable misalignments for the components; and the sizes and weights of the components.

10. The ball joint (15) according to claim 8, presenting parameters selected firstly from local shapes for the outer strap (17), said strap (17) is provided with a confinement casing (21) protecting the damper layers (19) and the rigid layers (20) against aggressive atmospheres, and secondly from dimensions of said strap (17), e.g. such that the damper layers (19) and the rigid layers (20) possess extended decoupling surfaces that are overdimensioned relative to mechanical and standards requirements.

11. The ball joint (15) according to claim 8, presenting in section in longitudinal elevation, an outer profile that is substantially oval in shape, having an inner core (22) for receiving the junction shaft (18) with an outline that is substantially spherical and having an outer axial rim (23) projecting from the spherical outline.

12. The ball joint (15) according to claim 8, the ball joint having a receiver outer strap (17) of substantially rectangular section, possessing an axial dimension that is smaller than the corresponding dimension of an inner core (22) for receiving the junction shaft (18).

13. The ball joint (15) according to claim 8, the ball joint having at least three dedicated damper layers (19) of elastomer having an outline possessing a rectilinear edge that forms an angle (A) of about 5° to 15°.

14. A ball joint (15) according to claim 8, including at least three rigid layers (20) of a precipitation-hardened steel alloyed in particular with chromium (11% to 18% by weight), nickel, and copper.

15. The ball joint (15) according to claim 8, wherein the materials of the damper layers (19) and of the rigid layers are suitable for presenting properties that are compatible with the maximum constraints expected on the laminated ball joint (15), up to a temperature of about −50° C. to +110° C., in particular +80° C.

16. The ball joint (15) prepared using the decoupling method in accordance with claim 1.

17. A mechanical connection for selective and vibratory decoupling of solidborne noise for a rotary wing aircraft (1) between the transmission gearbox (4) and the destination force transmission structure (7), the connection comprising at least three suspension bars (13) extending in a downwardly-flared configuration in the elevation direction, together with at least two devices (10) against negative torque, wherein at least one of said suspension bar (13) includes the laminated ball joint (15) at least one of its ends hinged to the transmission gearbox (4) and/or to the force transmission structure (7), said laminated ball joint (15) being in accordance with claim 8.

18. A mechanical connection according to claim 17, wherein each of the suspension bars (13) of the mechanical connection is provided with the laminated ball joint (15), interposed between each of the ends hinged to the force transmission structure (7) and an anchoring fitting of said structure (7).

19. A mechanical connection according to claim 17, wherein the outer strap (17) of the laminated ball joint (15) is welded to the end of the suspension bar (13).

20. A mechanical connection according to claim 17, wherein the junction shaft (18) of the laminated ball joint (15) is connected to a fitting by screw fastening said fitting comprising a pair of plates for connection to the junction shaft interconnected by a web for fastening to an anchoring soleplate provided with releasable assembly means disposed in at least two intersecting planes, at least one of which is placed against the force transmission structure (7).

21. A rotary wing aircraft (1) such as a helicopter, including at least one mechanical connection in accordance with claim 17.

* * * * *

UNITED STATES PATENT AND TRADEMARK OFFICE
CERTIFICATE OF CORRECTION

PATENT NO.       : 7,631,835 B2
APPLICATION NO.  : 11/500893
DATED            : December 15, 2009
INVENTOR(S)      : Rogelio Ferrer It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 798 days.

Signed and Sealed this

Twenty-first Day of December, 2010

David J. Kappos
*Director of the United States Patent and Trademark Office*